United States Patent

Hertzog et al.

[11] Patent Number: 6,111,377
[45] Date of Patent: Aug. 29, 2000

[54] CONTROL DEVICE FOR A MULTIPHASE ELECTRIC MOTOR

[75] Inventors: Nicolas Hertzog, Rueil-Malmaison; Joel Jacq, Osny; Christian Lange, Fontenay Tresigny; Thierry Ourth, Paris; Jean-Marc Romillon, Longnes, all of France

[73] Assignee: Schneider Electric SA, Boulogne Billancourt, France

[21] Appl. No.: 09/219,788

[22] Filed: Dec. 23, 1998

[30] Foreign Application Priority Data

Dec. 24, 1997 [FR] France ................................. 97 16866
Apr. 14, 1998 [FR] France ................................. 98 04808

[51] Int. Cl.[7] ............................. H02K 23/00; H02H 7/00
[52] U.S. Cl. ....................... 318/439; 318/254; 318/772; 307/113; 307/134; 361/8
[58] Field of Search .................... 318/254, 439, 318/138, 778–780, 722, 801; 307/38, 39, 112, 116, 113, 132 E, 134, 137, 139, 140, 141, 141.4; 361/1–3, 8, 23, 28, 29

[56] References Cited

U.S. PATENT DOCUMENTS

| | | | |
|---|---|---|---|
| 3,753,069 | 8/1973 | Newton | 318/440 |
| 4,100,469 | 7/1978 | Nelson et al. | 318/779 |
| 4,142,136 | 2/1979 | Witter . | |
| 4,438,472 | 3/1984 | Woodworth | 361/13 |
| 4,491,197 | 1/1985 | Nishiwaki | 187/296 |
| 4,566,289 | 1/1986 | Iizuka et al. | 62/228.4 |
| 4,642,481 | 2/1987 | Bielinski et al. | 327/451 |
| 4,931,715 | 6/1990 | Lee et al. | 318/709 |
| 4,996,469 | 2/1991 | DeLange et al. . | |
| 5,111,059 | 5/1992 | Woodworth | 307/87 |
| 5,130,628 | 7/1992 | Owen | 318/780 |
| 5,164,651 | 11/1992 | Hu et al. | 318/778 |
| 5,714,851 | 2/1998 | Antony et al. | 318/148 |

FOREIGN PATENT DOCUMENTS 0 149 873  7/1985  European Pat. Off. .
2 165 408  4/1986  United Kingdom .

*Primary Examiner*—Brian Sircus
*Attorney, Agent, or Firm*—Oblon, Spivak, McClelland, Maier & Neustadt, P.C.

[57] ABSTRACT

Control device for a multiphase electric motor (M) comprising firstly two two-directional static switches (IS1, IS2) each associated with a terminal of a shunt contactor (S) installed in parallel, these switches (IS1, IS2, S) being controlled by a control circuit (C) controlling progressive operation of the motor, characterized in that the shunt contactor (S) is of the four-pole type and is fitted with solid connection parts (6, 7) each connecting two terminals of the said contactor, these connection parts (6, 7) being connected in pairs (L1, L3) to the terminals of the static switches (IS1, IS2) such that each (IS1 or IS2) is connected to two terminals.

9 Claims, 4 Drawing Sheets

CONTROL DEVICE FOR A MULTIPHASE ELECTRIC MOTOR

This invention relates to a control device for a multiphase electric motor comprising two two-directional static switches each associated with a shunt contactor terminal mounted in parallel, these switches being controlled by a control circuit enabling graduated operation of the motor (gradual start or stop).

Control devices for three-phase asynchronous motors capable of smooth and gradual starting or stopping, avoiding jerks, are known. They comprise static switches composed of thyristors mounted top-to-bottom and associated with a shunt contactor in parallel. These switches are controlled by an electronic control circuit. The shunt contactor operates in single phase and its performances are very much degraded. Electrical arcs may appear in some situations between the contacts of the shunt contactor.

The purpose of this invention is to associate the device according to the invention with a shunt contactor on the motor three phase power supply network, designed to switch off three-phase currents by breaking the current in the same way as in single phase, without reducing the performances (breaking on two phases of a three phase network is comparable to breaking a single phase since the break time is longer). Its purpose is to avoid damage to contacts during closing and opening. Furthermore, if the contactor breaks in the case of the voltage drop without being ordered to do so, the thyristors will provide service continuity.

The device according to the invention is characterized in that the four pole type shunt contactor supports solid connection parts each connecting two terminals of the said contactor, these connection parts being connected in pairs to the terminals of the static switches such that each is connected to two terminals.

The invention will now be described in more detail with reference to an embodiment given as an example and shown on the attached drawings in which.

Figure 1:
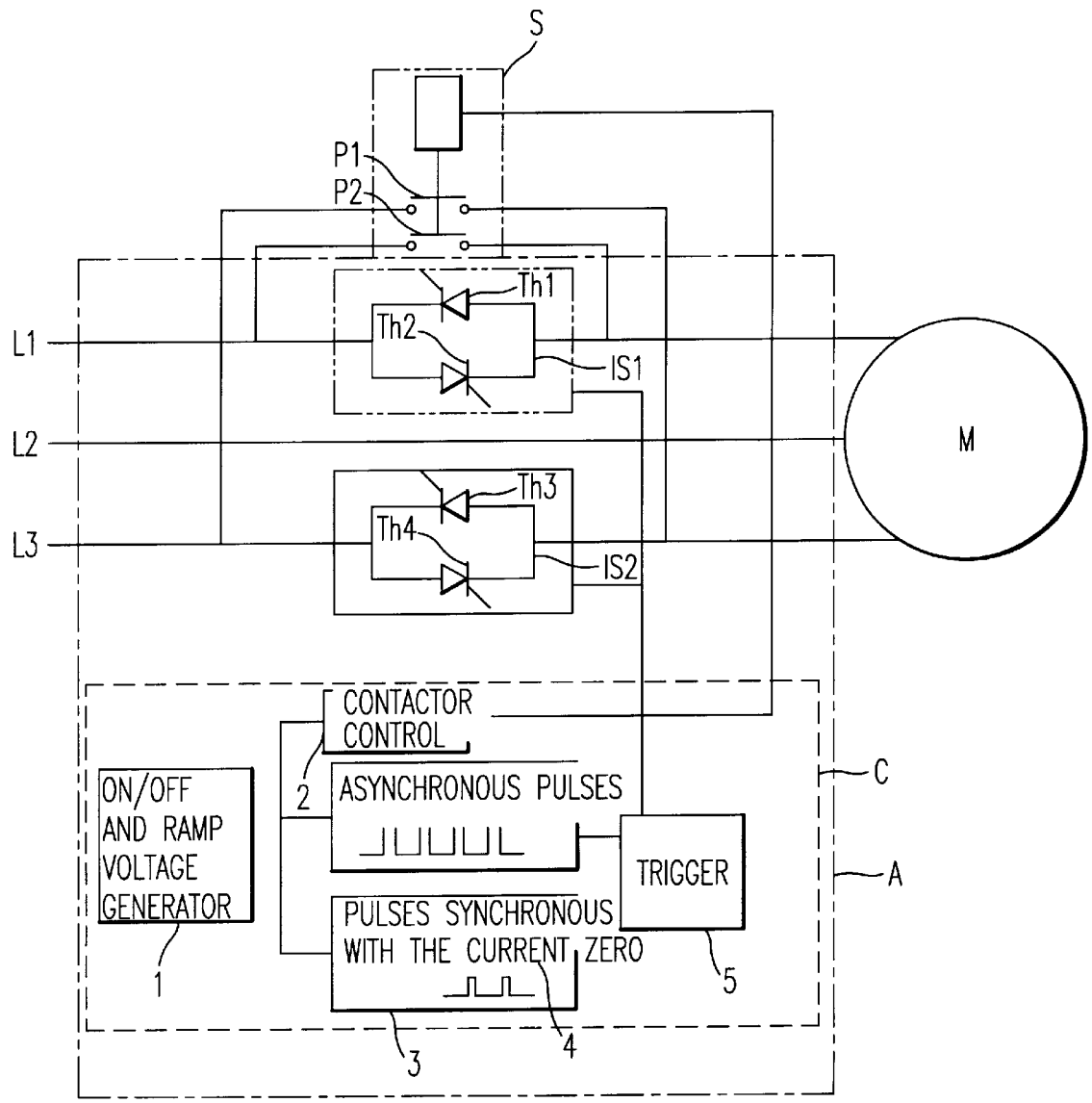
FIG. 1 is a functional diagram of the device according to the invention.
Figure 2:
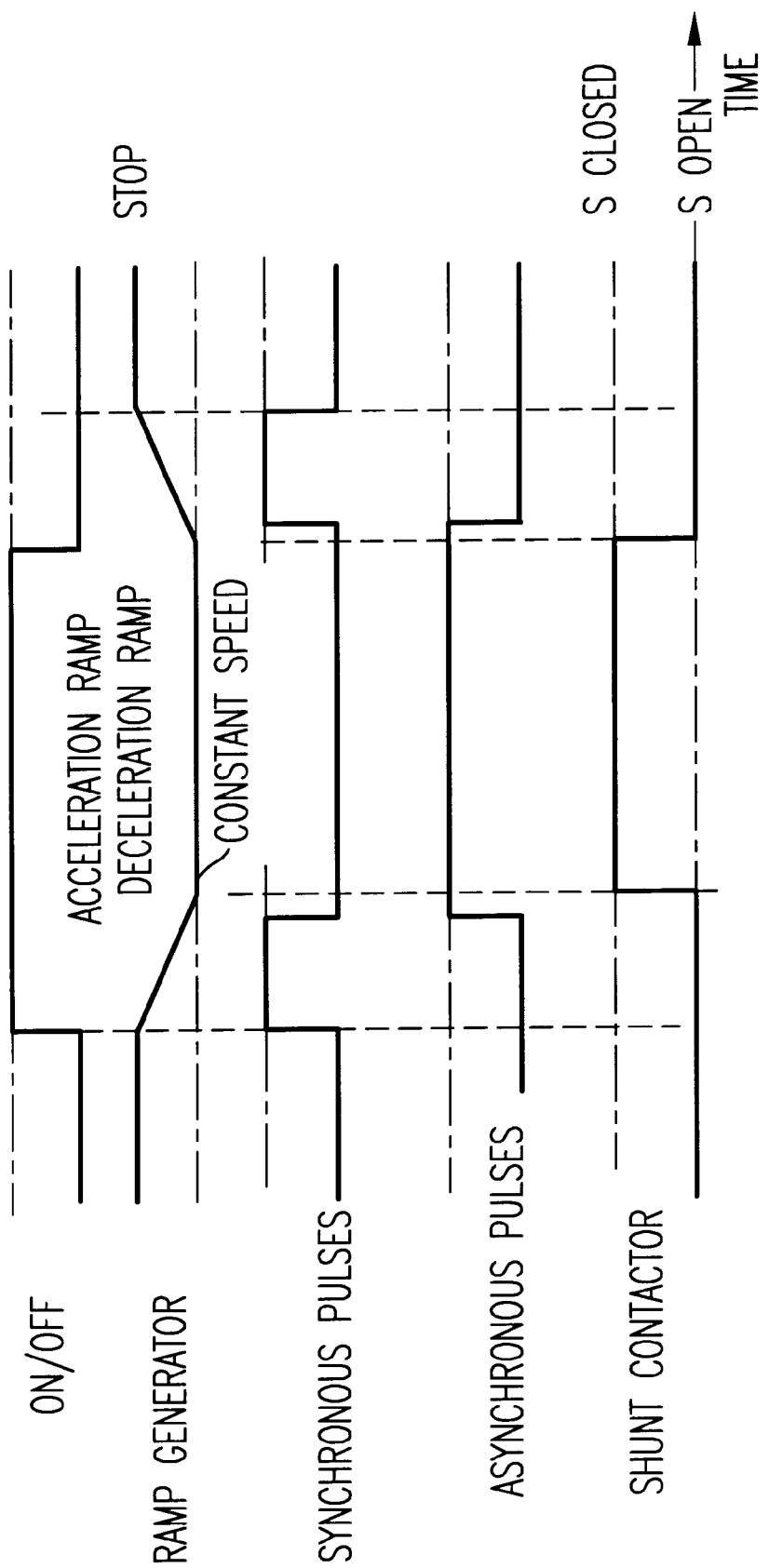
FIG. 2 is a time diagram illustrating operation of various circuits in the device.

With reference to FIG. 1, a device mark A outputs a progressive electrical power supply to an electric motor M, firstly during the start or acceleration phases, and secondly during slowing or deceleration phases. It is connected to the motor power supply lines L1, L2 and L3. It is fitted with two directional static switches on the two phases L1 and L3, references IS1 and IS2 respectively. Each of these switches IS1 and IS2 is composed of two thyristors Th1-Th2 or Th3-Th4 respectively, mounted in parallel, top-to-bottom, so that AC current can pass through them when they are conducting. These thyristors could be replaced by a component with similar power.

The static switch thyristors are controlled through a control circuit C which works through a trigger 5 to send pulses to the gates of these thyristors, to make them conducting.

A breaking terminal P1 of a shunt contactor S is connected through a parallel circuit to the terminals of the static switch IS1. Similarly, the breaking terminal P2 of the shunt contactor S is connected through a parallel circuit to the terminals of the static switch IS2. Note that phase L2 is neither controlled by thyristors nor shunted by a terminal of the contactor S.

This shunt contactor S is controlled through the control circuit C so as to short circuit static switches IS1 and IS2 starting from the end of an acceleration ramp until the beginning of the next deceleration ramp.

The shunt contactor S may be of the four-pole type, the breaking terminals being associated in pairs with the two static switches.

The control circuit C comprises a voltage generator 1 which generates a voltage called the ramp voltage Vr at the output, which is broken down into a decreasing ramp (during an acceleration phase), a constant voltage corresponding to the nominal motor speed, and an increasing ramp (during the next deceleration phase). This ramp voltage Vr is injected into a control circuit 2 controlling the shunt contactor S, into a synchronous pulse generation circuit 3 sending the said pulses to the trigger 5 of the thyristors and to an asynchronous pulse generation circuit sending the said pulses to the same trigger 5. This trigger isolates and injects the pulses on the gates of the thyristors in the static switch IS1 and/or on the gates of the thyristors in the static switch IS2.

Figure 3:
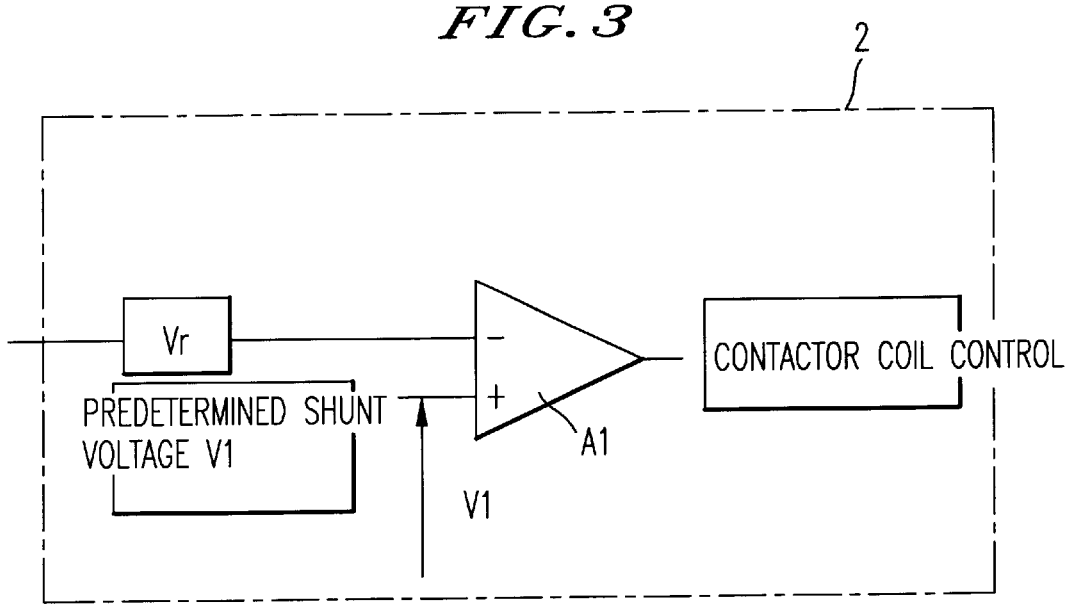
FIG. 3 is a diagram showing the control circuit of the shunt contactor.

The shunt control circuit 2 shown in FIG. 3 comprises a comparator A1 which receives the ramp voltage Vr from the ramp generator 1 and a pre-determined voltage called the shunt voltage that will be denoted V1, on its outputs. When the ramp voltage output by the ramp generator reaches a value less than or equal to the shunt voltage V1, the output from comparator A1 switches and controls closure of the shunt switch S.

Figure 4:
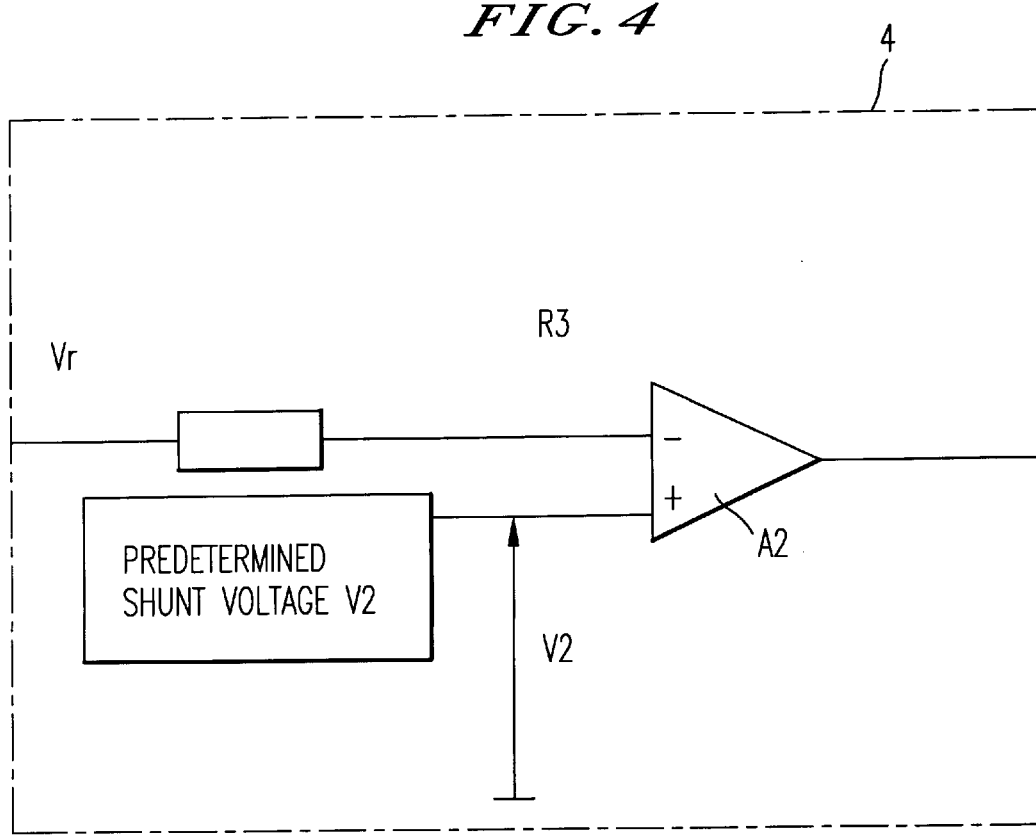
FIG. 4 is a diagram of the asynchronous pulse circuit.

The circuit 4, shown in FIG. 4, comprises a comparator A2 that receives the voltage Vr from ramp generator 1, and a reference voltage V2, on its inputs. When the voltage sent by the ramp generator reaches a value less than or equal to the voltage threshold V2, the output from comparator A2 makes the control signal that controls trigger 5 change level. The voltage threshold V1 drops below the voltage threshold V2.

The trigger 5 injects variable frequency pulses on the thyristor gates, as a function of the control signal. When the control signal is at a first level, the trigger 5 outputs pulses synchronized on the current during the acceleration or deceleration phases. When this signal is at a second level, the trigger 5 then outputs pulses that are not synchronized on the current but with higher frequencies, during the period at constant nominal speed.

Figure 5:
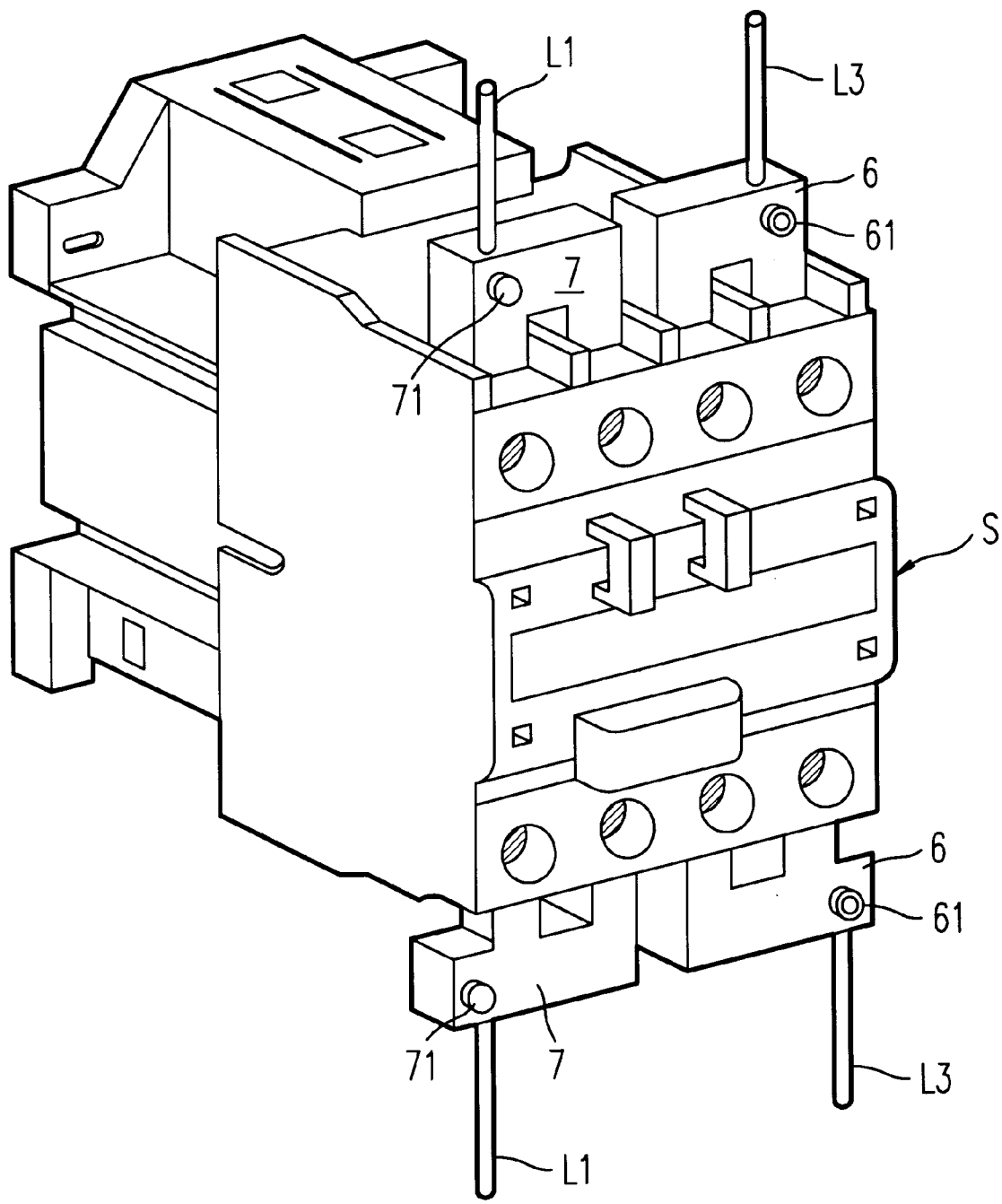
FIG. 5 is a view of the shunt contactor equipped with solid connection parts.

Referring to FIG. 5, the shunt contactor S is of the four-pole type. Solid connection parts 6, 7 are fitted at the terminals of this contactor, each connecting two terminals of the said contactor, these connection parts 6, 7 being connected in pairs through cables or wires L1, L3 to the terminals of static switches IS1, IS2 such that each is connected to two terminals.

Each of the connection parts 6, 7 is fitted with a terminal 61, 71 to connect a cable or wire L1, L3 connected to a terminal for static switch IS1 or IS2. These solid connection parts 6, 7 act as heat sinks and are used for cooling.

The device operates as follows:

When the motor is stopped, no pulses are applied to the gates of the thyristors which therefore do not conduct.

The ramp voltage generator 1 outputs a decreasing voltage during an acceleration phase. The control circuit 2 applies pulses to the thyristor gates, the pulses being synchronized with the current zero or the voltage zero. These "synchronous" pulses provoke an increase in the RMS voltage at the motor terminals, during each alternation of the power supply network. The shunt contactor S remains open during this acceleration phase.

Consider the end of this acceleration phase and the changeover to the constant nominal speed phase. When threshold V2 is reached, higher frequency pulses are applied to the thyristor gates. The shunt circuit 2 controls closure of the shunt contactor S at a voltage called the "shunt" voltage, below voltage V2. As soon as the shunt contactor S is closed, current passes through its terminals and the current passing through the thyristors cancels out.

High frequency, constant and "asynchronous" pulses are continuously applied to the thyristor gates during the entire constant period corresponding to "normal speed".

The voltage generator 1 outputs an increasing voltage during a deceleration phase that may or may not stop the motor. At voltage V1, the circuit 2 controls opening of the shunt contactor S. At voltage V2, "synchronous" pulses are sent to the thyristors. These pulses reduce the RMS voltage at the motor terminals. Note that the shunt contactor S opens when high frequency pulses are sent to the thyristors.

The product stops as soon as the deceleration ramp terminates.

Thyristor gates continuously receive pulses a little before the shunt contactor receives the close order and a little after the shunt contactor receives the open order.

Obviously, it will be possible to imagine variants and improvements to detail and even to consider the use of equivalent means, without going outside the framework of the invention.

What is claimed is:

1. Control device for a multi-phase electric motor comprising:

two two-directional static switches;

a shunt contactor terminal mounted in parallel to said switches;

a control circuit configured to control said switches and said shunt contactor terminal thereby controlling progressive operation of the motor, wherein the control circuit comprises means for continuously sending pulses to said two-directional static switches during a period beginning before a close order for the shunt contactor and ending after an open order for the contactor.

2. Device according to claim 1, wherein the control circuit comprises a ramp voltage generation circuit the output voltage of which is sent to a shunt circuit configured to control the shunt switch, to a synchronous pulse generation circuit, and to an asynchronous pulse generation circuit (4), said synchronous and asynchronous circuits configured to control a trigger of the static switches.

3. Device according to claim 2, wherein the shunt circuit comprises means for controlling closure of the contactor when the output voltage (Vr) of the ramp generator reaches a shunt voltage (V1).

4. Device according to claim 3, wherein the shunt circuit comprises means for comparing the output voltage (Vr) of the ramp generator with the shunt voltage (V1).

5. Device according to claim 2 or 3, further comprising means for controlling the synchronous pulse generation circuit and the asynchronous pulse generation circuit so as to alternately inject asynchronous pulses and pulses synchronized to the current, onto the static switches.

6. Device according to claim 5, further comprising means for changing from injection of synchronous pulses to asynchronous pulses and vice-versa for a voltage (V2) exceeding the shunt voltage (V1).

7. Device according to claim 1 or 2, wherein the shunt contactor is a four pole contactor mounted such that each static switch is connected with two terminals of the contactor.

8. Device according to claim 7, wherein the shunt contactor carries solid connection parts each connecting two terminals of said contactor, said connection parts being connected in pairs to the terminals of the static switches, such that each static switch is connected to two poles.

9. Device according to claim 8, wherein each of the connection parts includes a terminal to connect one of a cable and wire to a terminal of one of said static switches.

* * * * *